US011982868B2

(12) United States Patent
Gomibuchi et al.

(10) Patent No.: US 11,982,868 B2
(45) Date of Patent: May 14, 2024

(54) LENS BARREL AND IMAGING DEVICE

(71) Applicant: NIKON CORPORATION, Tokyo (JP)

(72) Inventors: Osamu Gomibuchi, Tokyo (JP); Makoto Horikoshi, Tokyo (JP); Mizuki Wayu, Tokyo (JP); Tsuneo Watanabe, Tokyo (JP); Kenichi Kitano, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 457 days.

(21) Appl. No.: 17/430,486

(22) PCT Filed: Dec. 18, 2019

(86) PCT No.: PCT/JP2019/049636
§ 371 (c)(1),
(2) Date: Aug. 12, 2021

(87) PCT Pub. No.: WO2020/170586
PCT Pub. Date: Aug. 27, 2020

(65) Prior Publication Data
US 2022/0137325 A1   May 5, 2022

(30) Foreign Application Priority Data
Feb. 22, 2019  (JP) .................. 2019-030092

(51) Int. Cl.
*G02B 7/10* (2021.01)
*G03B 17/12* (2021.01)

(52) U.S. Cl.
CPC ............... *G02B 7/10* (2013.01); *G03B 17/12* (2013.01)

(58) Field of Classification Search
CPC . G02B 7/10; G02B 7/08; G03B 17/12; G03B 2205/0046; H04N 23/55
See application file for complete search history.

(56) References Cited

U.S. PATENT DOCUMENTS

| 2012/0262595 A1 | 10/2012 | Kishida et al. |
| 2015/0062408 A1 | 3/2015 | Yano |

(Continued)

FOREIGN PATENT DOCUMENTS

| JP | 2013-011918 A | 1/2013 |
| JP | 2015-049334 A | 3/2015 |

(Continued)

OTHER PUBLICATIONS

Mar. 31, 2020 International Search Report issued in International Patent Application No. PCT/JP2019/049636.

*Primary Examiner* — James C. Jones
(74) *Attorney, Agent, or Firm* — Oliff PLC

(57) ABSTRACT

A lens barrel and an imaging device which can be miniaturized, the lens barrel with a movable cylinder that moves along the optical axis with a change in focal length; first and second drive units in the movable cylinder; and first and second lens driven by the first and second drive units respectively to move along the optical axis relative to the movable cylinder. The movement amount of the first lens relative to the cylinder when the focal length is changed to a second focal length from a first state where the first lens is at a position closest to a subject with a first focal length is less than the movement amount of the first lens relative to the cylinder when the focal length is changed to the second focal length from a second state where the first lens is closer to an image plane than the first state.

11 Claims, 7 Drawing Sheets

(56) References Cited

U.S. PATENT DOCUMENTS

| | | |
|---|---|---|
| 2018/0217352 A1 | 8/2018 | Kamba et al. |
| 2019/0179109 A1 | 6/2019 | Sakai et al. |
| 2020/0218030 A1* | 7/2020 | Kishimoto ............. G02B 7/026 |

FOREIGN PATENT DOCUMENTS

| | | |
|---|---|---|
| JP | 2018-124527 A | 8/2018 |
| WO | 2011/048752 A1 | 4/2011 |
| WO | 2018/221723 A1 | 12/2018 |

* cited by examiner

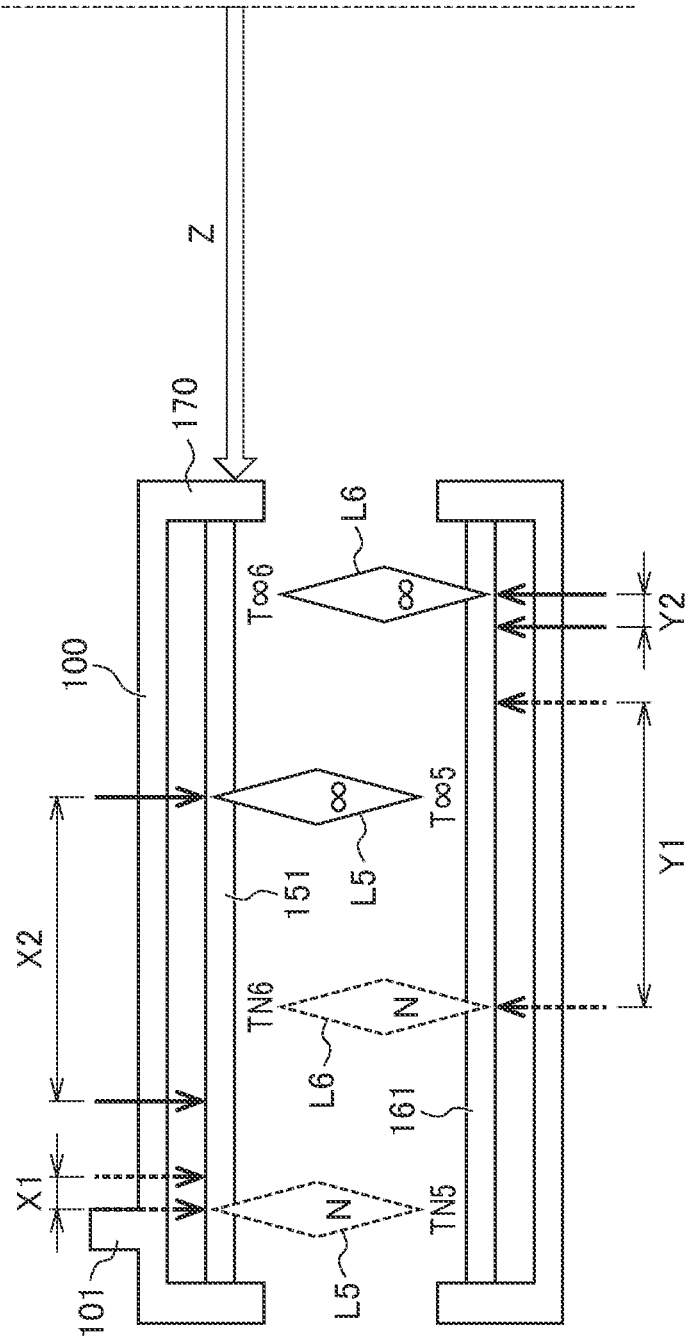

LENS BARREL AND IMAGING DEVICE

TECHNICAL FIELD

The present invention relates to a lens barrel and an imaging device.

BACKGROUND ART

Various proposals have heretofore been made, in which a focus lens is provided and driven by a motor (e.g., see Japanese Unexamined Patent Application, Publication No. 2015-49334). Further downsizing of a lens barrel is desired.
Patent Document 1: Japanese Unexamined Patent Application, Publication No. 2015-49334

DISCLOSURE OF THE INVENTION

A lens barrel of a first aspect is configured to include: a moving tube that moves along an optical axis when changing a focal length; a first driving part provided to the moving tube; a first lens that relatively moves along the optical axis with respect to the moving tube by the first driving part; a second driving part provided to the moving tube; and a second lens that relatively moves along the optical axis with respect to the moving tube by the second driving part, in which a moving distance of the first lens with respect to the moving tube, in a case of changing a focal length to a second focal length in a first state in which the first lens is arranged closest to a subject side at a first focal length, is smaller than a moving distance of the first lens with respect to the moving tube, in a case of changing a focal length to the second focal length in a second state in which the first lens is arranged closer to an image surface side at the first focal length than in the first state.

A lens barrel of a second aspect is configured to include: a moving tube that moves along an optical axis when changing a focal length; a first driving part provided to the moving tube; a first lens that relatively moves along the optical axis with respect to the moving tube by the first driving part; a second driving part provided to the moving tube; and a second lens that relatively moves along the optical axis with respect to the moving tube by the second driving part, in which a moving distance of the first lens with respect to the moving tube, in a case of changing a focal length to a second focal length in a first state in which the first lens is arranged closest to a subject side at a first focal length, is smaller than a moving distance of the second lens with respect to the moving tube, in a case of changing a focal length to the second focal length in the first state.

A lens barrel of a third aspect is configured to include: a moving tube that moves along an optical axis when changing a focal length; a first driving part provided to the moving tube; a first lens that relatively moves along the optical axis with respect to the moving tube by the first driving part; a second driving part provided to the moving tube; and a second lens that relatively moves along the optical axis with respect to the moving tube by the second driving part, in which a moving distance of the first lens arranged closest to a subject side in a case of changing a focal length is smaller than a moving distance of the second lens arranged closest to the subject side in a case of changing a focal length.

An imaging device of a fourth aspect is configured to include the lens barrel described above.

BRIEF DESCRIPTION OF THE DRAWINGS

FIGS. 5A and 5B are diagrams illustrating a moving state of a unit-five lens L5 and a unit-six lens L6, in which the zoom position is a wide-angle end in FIG. 5A and a telescopic end in FIG. 5B.

PREFERRED MODE FOR CARRYING OUT THE INVENTION

Figure 1:
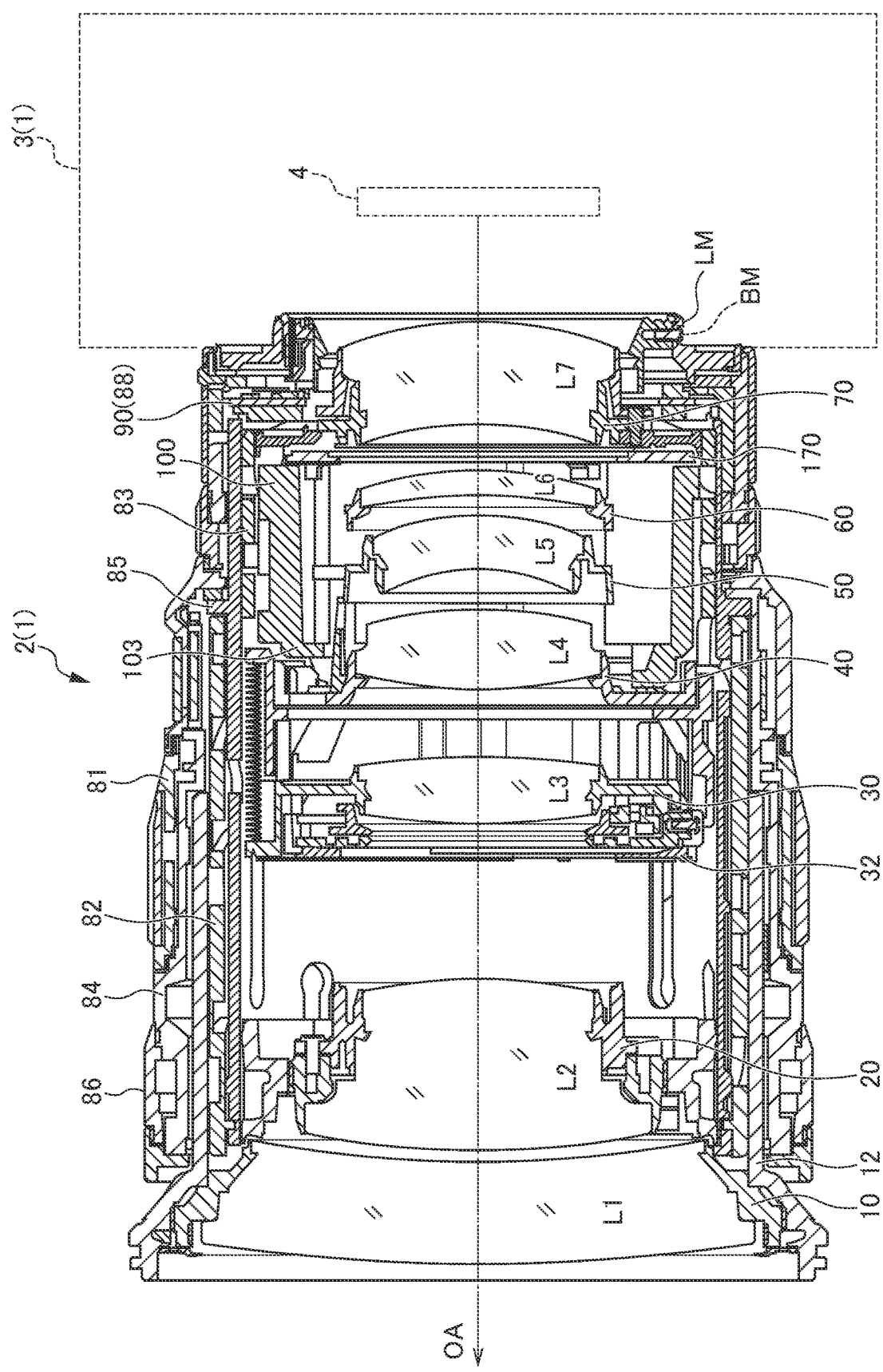
FIG. 1 is a conceptual diagram of a camera 1 configured by attaching a lens barrel 2 as an embodiment to a camera body 3.

FIG. 1 is a conceptual diagram of a camera 1 as an imaging device, which is configured by mounting a lens barrel 2 as an embodiment to a camera body 3. In the following description, the subject side of the lens barrel 2 in an optical axis OA direction is referred to as a front side, and the camera body 3 side is referred to as a rear side. Movement of the lens barrel 2 in the optical axis OA direction is referred to as "linear travel", and rotational movement thereof around the optical axis OA is referred to as "rotation". In a radial direction orthogonal to the optical axis OA of the lens barrel 2, the side separating from the optical axis OA is referred to as an outer diameter side, and the side approaching the optical axis OA is referred to as an inner diameter side.

The camera 1 includes the camera body 3 and the lens barrel 2. The lens barrel 2 is provided with a lens mount LM on a rear part (proximal end) thereof, engages with a body mount BM of the camera body 3, and is thereby detachably mounted to the camera body 3.

The camera body 3 is a so-called digital camera, which includes an imaging element 4 for converting an optical image into an electric signal, processes imaging data generated by the imaging element 4, and records the data on a recording part (not illustrated) or displays the data on a display part (not illustrated).

The camera may be a single-lens reflex camera, a mirrorless camera, a compact digital camera, or a two-lens camera. The camera may be a camera built in a smartphone or tablet.

The camera body 3 is provided with a power switch (not illustrated). ON/OFF signals of the power switch or signals indicating focusing or aperture values are transmitted to a control part 90 of the lens barrel 2, which will be described later.

The lens barrel 2 is a so-called zoom lens capable of changing the focal length, and includes, from the front side: a unit-one lens L1, a unit-two lens L2, a unit-three lens L3, a unit-four lens L4, a unit-five lens L5, a unit-six lens L6, and a unit-seven lens L7.

The unit-one lens L1, the unit-two lens L2, the unit-three lens L3, the unit-four lens L4, the unit-five lens L5, the unit-six lens L6, and the unit-seven lens L7 move in the optical axis OA direction when zooming.

The unit-five lens L5 and the unit-six lens L6 are focus lens units which move in the motor moving tube 100 when focusing, which will be described later. The lens barrel 2 of the present embodiment is provided with two focus lens units as described above. Therefore, the weight per focus lens unit can be reduced, and even an actuator having a small driving force such as a stepping motor can drive the focus lens unit. Focusing performance can be improved.

The unit-one lens L1 is retained in the unit-one frame 10, and a unit-one sliding tube 12 extends from the unit-one frame 10 to the rear side. The unit-two lens L2 is retained in the unit-two frame 20. The unit-three lens L3 is retained in the unit-three frame 30. An aperture unit 32 is attached to the front side of the unit-three frame 30. The unit-four lens L4 is retained in the unit-four frame 40, the unit-five lens L5 is retained in the unit-five frame 50, the unit-six lens L6 is retained in the unit-six frame 60, and the unit-seven lens L7 is retained in the unit-seven frame 70.

The lens barrel 2 includes an outer fixed tube 84 and an inner fixed tube 85, in which a zoom ring 81 and a focus ring 86 are rotatably provided to an outer circumference of the outer fixed tube 84. The unit-one sliding tube 12, an outer cam tube 82, the inner fixed tube 85, an inner cam tube 83, and the motor moving tube 100 are arranged in this order from the outer fixed tube 84 to the inner diameter side.

A coupling pin (not illustrated) extends from the zoom ring 81 to the inner diameter side. The coupling pin passes through a circumferential groove (not illustrated) provided to the outer fixed tube 84 and is coupled to the outer cam tube 82. When the zoom ring 81 rotates in the circumferential direction, the coupling pin also rotates in the circumferential direction, and the outer cam tube 82 rotates together with the zoom ring 81.

Figure 2:
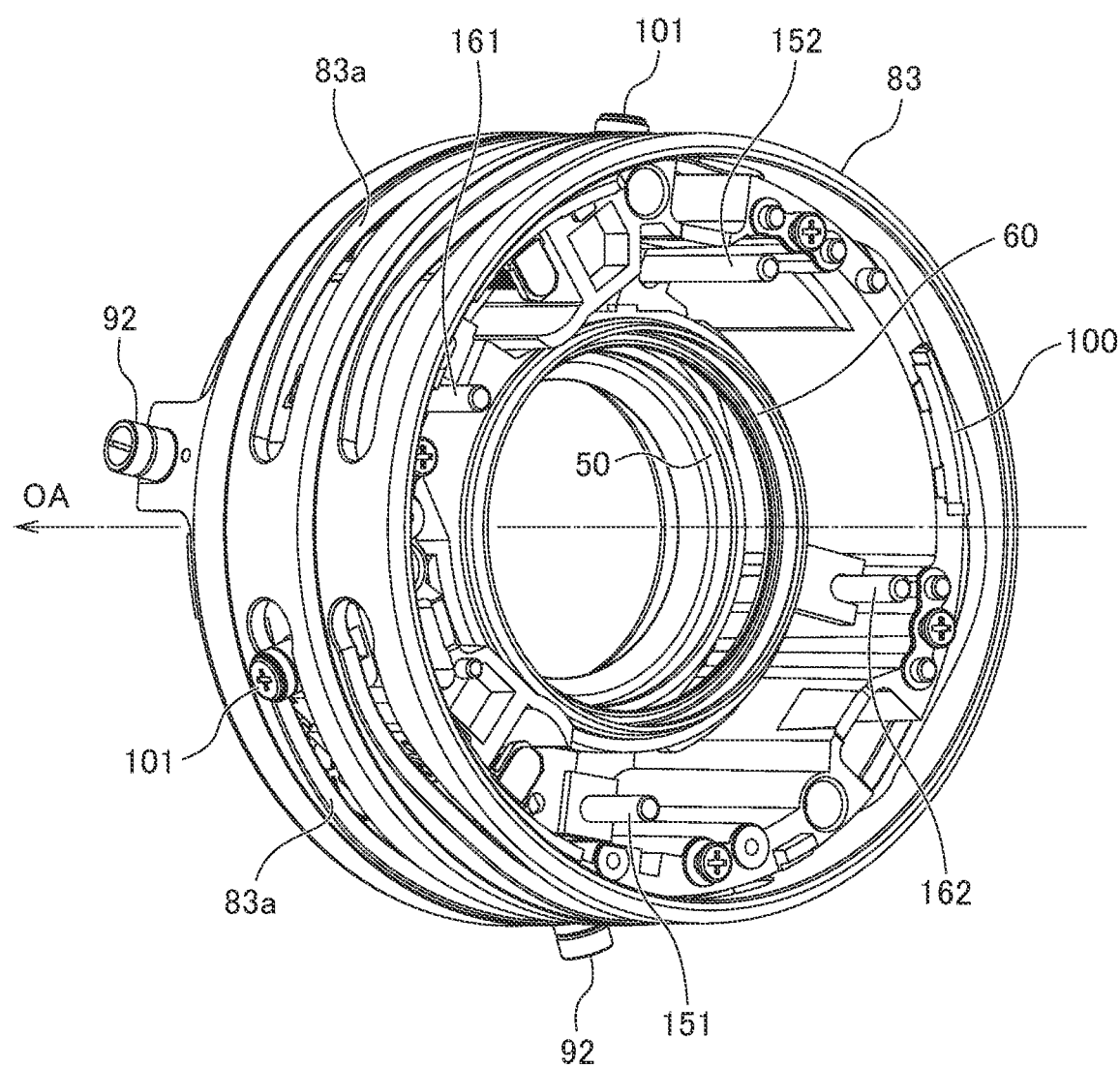
FIG. 2 is a perspective view of an inner cam tube 83 of the lens barrel 2, and tube members arranged on an inner diameter side thereof.

FIG. 2 is a perspective view of the inner cam tube 83 of the lens barrel 2, and a plurality of tube members arranged on the inner diameter side thereof. The unit-five lens L5 and the unit-six lens L6 are not illustrated. A cam follower 92 is provided on the outer diameter side of the inner cam tube 83. The cam follower 92 passes through a cam groove for driving cam (not illustrated) provided to the inner fixed tube 85, and is inserted into a linear groove (not illustrated) provided to the outer cam tube 82. When the outer cam tube 82 rotates in the circumferential direction, the cam follower 92 travels linearly while rotating in the circumferential direction, and the inner cam tube 83 rotates and travels linearly.

A cam groove 83a for driving the motor moving tube 100 is provided to the inner cam tube 83. The groove for driving the motor moving tube 100 provided to the inner cam tube 83 is not limited to a circumferential groove and may be a circumferential groove or a linear groove.

Figure 3:
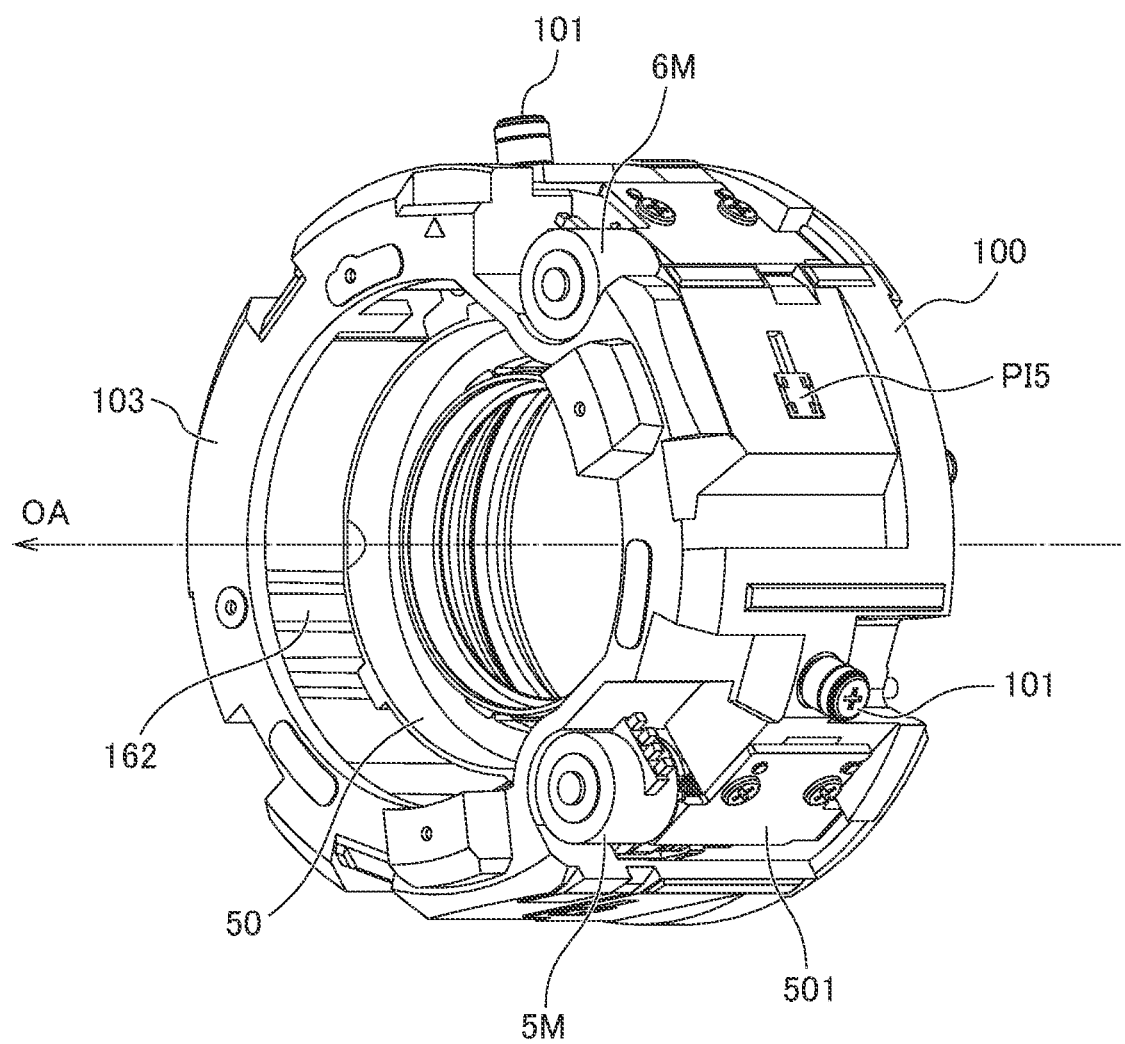
FIG. 3 is a perspective view observed from a side opposite to FIG. 2 by removing the inner cam tube 83 from FIG. 2.

FIG. 3 is a perspective view observed from the subject side, which is a side opposite to FIG. 2, by removing the inner cam tube 83 from FIG. 2. The cam pin 101 extends from the motor moving tube 100 to the outer diameter side. The cam pin 101 engages with the cam groove 83a provided to the inner cam tube 83 and a linear groove (not illustrated) of the inner fixed tube 85.

When the zoom ring 81 rotates, the inner cam tube 83 travels linearly while rotating, the cam pin 101 causes the motor moving tube 100 to move in a linearly traveling direction without rotation by way of a linearly traveling component of the travel of inner cam tube 83, and the unit-five lens L5 and the unit-six lens L6 travel linearly along with this.

A main guide bar 151 and a sub guide bar 152 for the unit five, and a main guide bar 161 and a sub guide bar 162 for the unit six extend between a front wall part 103 of the motor moving tube 100 and a guide bar holding member 170 (illustrated in FIG. 1). The main guide bar 151, the sub guide bar 152, the main guide bar 161, and the sub guide bar 162 extend in the optical axis OA direction, at substantially the same position in an overlapping manner. The guide bars are not limited thereto and may overlap with each other at least in part in the optical axis OA direction.

A unit-five driving part 5M such as a stepping motor and a unit-six driving part 6M such as a stepping motor are fixed to the motor moving tube 100. The unit-five driving part 5M and the unit-six driving part 6M are not limited to a stepping motor, and may be a motor such as a voice coil motor or an ultrasonic motor.

Figure 4:
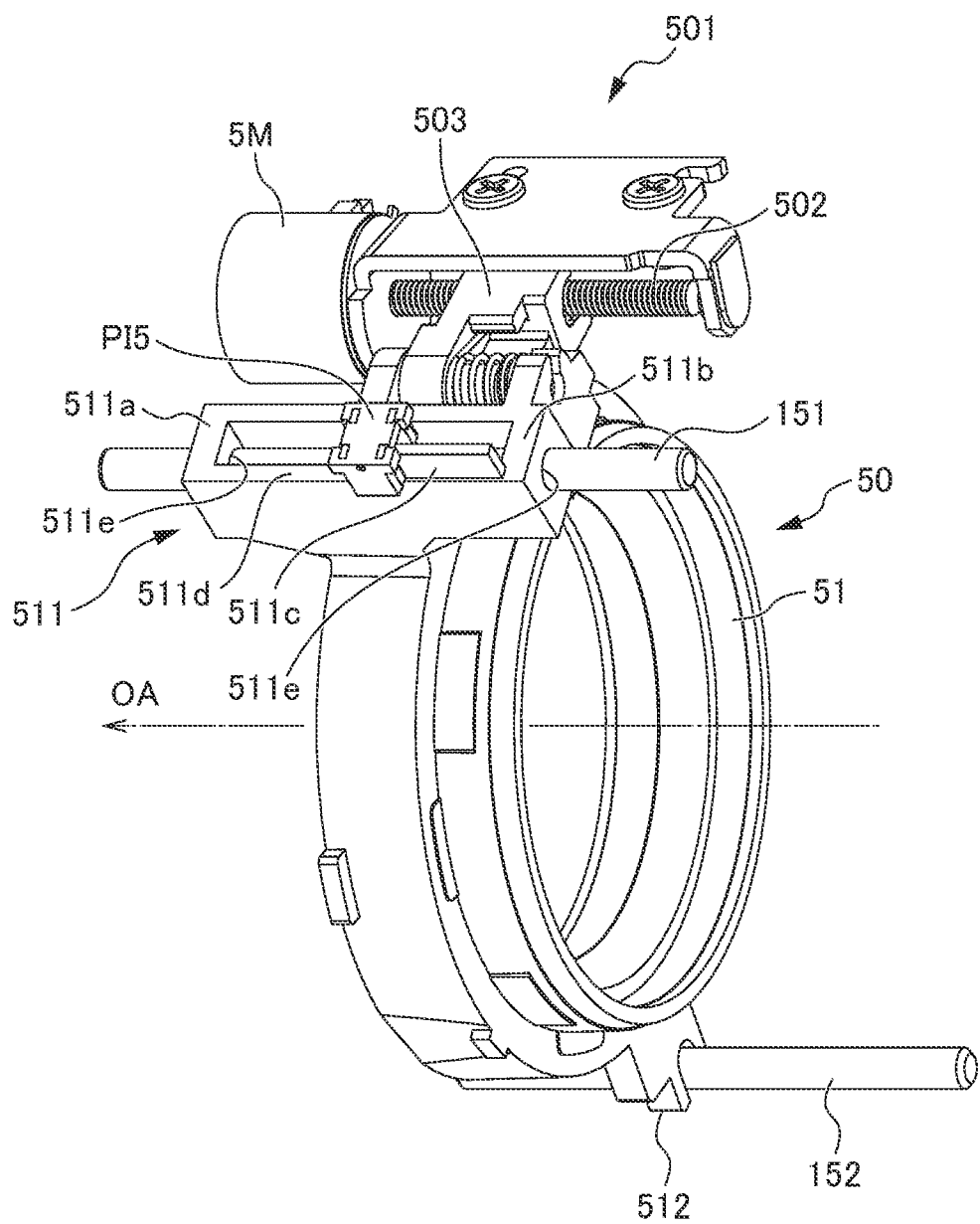
FIG. 4 is a diagram illustrating only a driving mechanism of a unit-five frame 50 by removing a motor moving tube 100 from FIG. 3.

FIG. 4 is a diagram illustrating only a driving mechanism of the unit-five frame 50, in which the motor moving tube 100 is removed from FIG. 3. The driving mechanism of the unit-six frame 60 is substantially the same as the driving mechanism of the unit-five frame 50; therefore, only the driving mechanism of the unit-five frame 50 will be described below, and the driving mechanism of the unit-six frame 60 will be omitted.

The unit-five frame 50 is provide with the unit-five retaining part 51 covering the outer circumference of the unit-five lens L5, a main guide bar engaging part 511 extending from the outer circumference of the unit-five retaining part 51 to the outer diameter side, and a sub guide bar engaging part 512. The sub guide bar engaging part 512 is provided at a position approximately 180 degrees with respect to the main guide bar 151.

The main guide bar engaging part 511 includes a front wall 511a and a rear wall 511b provided in front and rear thereof, as well as a side wall 511d connecting the front wall 511a and the rear wall 511b. Each of the front wall 511a and the rear wall 511b is provided with a guide bar insertion hole 511e, through which a main guide bar 151 slidably penetrates, which will be described later.

A light shielding part 511c is provided to protrude from the side wall 511d to the outer diameter side. The light shielding part 511c is a portion like a rectangular plate extending for a predetermined distance in the optical axis OA direction. The light shielding part 511c is a member for blocking light from a photo interrupter (PI) 5 attached to the motor moving tube 100. The light shielding part 511c and the photo interrupter PI5 can detect a position of the unit-five lens L5.

The sub guide bar engaging part 512 is a member provided with a U-shaped groove open to the outer diameter side. The sub guide bar 152 is slidably inserted into the U-shaped groove. The U-shaped groove of the sub guide bar engaging part 512 engages with the sub guide bar 152 as described above, preventing rotation around the main guide bar 151 in the circumferential direction.

A unit frame 501 screwed onto the motor moving tube 100 is attached to the image side of the unit-five driving part 5M in the optical axis OA direction. A lead screw 502 extends from the unit-five driving part 5M to the rear side in the optical axis OA direction, and has a rear end rotatably retained in the unit frame 501. The lead screw 502 may be configured to extend to the subject side of the unit-five driving part 5M in the optical axis OA direction, depending on the moving range of the unit-five lens L5.

A moving rack 503 engages with the lead screw 502. The moving rack 503 is retained by the main guide bar engaging part 511.

Returning to FIG. 1, a main circuit board 88 is attached to the end of the rear side of the inner fixed tube 85 by screws. The main circuit board 88 includes the control part 90; when the focus ring 86 or the zoom ring 81 rotates, a rotational amount thereof is detected and inputted to the control part 90.

When a photographer performs a focusing operation such as pressing the release halfway down, the camera body 3 inputs a signal to the control part 90.

Then, the control part 90 transmits a pulse to the unit-five driving part 5M, driving the unit-five driving part 5M. When the unit-five driving part 5M is driven, the lead screw 502 illustrated in the drawings such as FIG. 4 rotates, and the moving rack 503 engaging with the lead screw 502 moves in the optical axis OA direction (direction along the optical axis OA). When the moving rack 503 moves, the main guide bar 151 guides the main guide bar engaging part 511 to travel linearly, and the unit-five frame 50 and the unit-five lens L5 move in the optical axis OA direction.

In a similar manner, the unit-six frame 60 and the unit-six lens L6 are driven in the optical axis OA direction by the unit-six driving part 6M when zooming or focusing. As described above, the unit-five lens L5 moves in the optical axis direction by the motor moving tube 100 and the unit-five driving part 5M.

Therefore, the moving distance of the unit-five lens L5 is divided into a distance moved by the motor moving tube 100 and a distance moved by the unit-five driving part 5M. In the case of the unit-six lens L6 as well, the moving distance of the unit-six lens L6 is divided into a distance moved by the motor moving tube 100 and a distance moved by the unit-six driving part 6M.

Figure 5A:
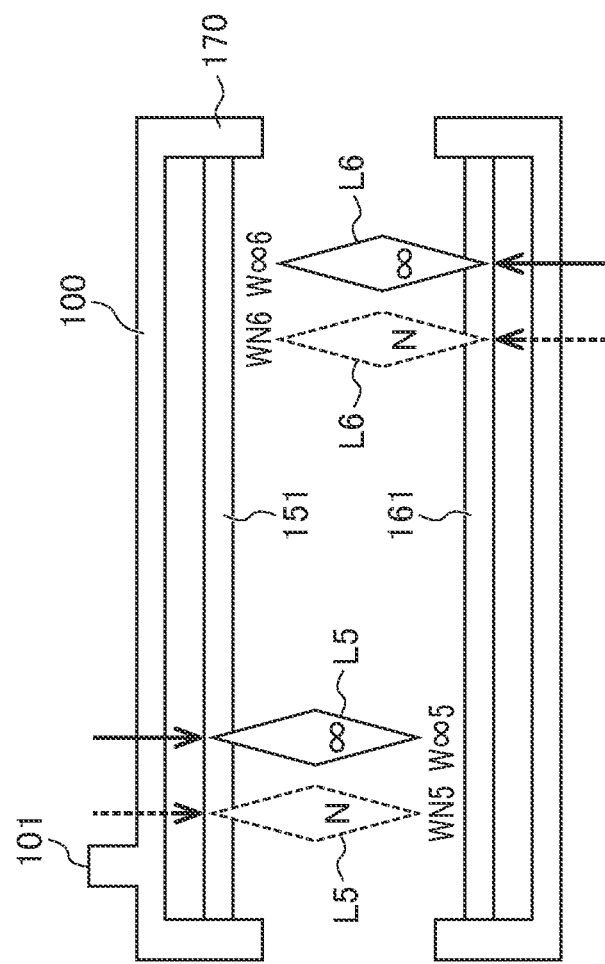

FIGS. 5A and 5B are diagrams illustrating a moving state of the unit-five lens L5 and the unit-six lens L6, in which the zoom position is a wide-angle end W in FIG. 5A and a telescopic end T in FIG. 5B.

In the present embodiment, as described above, the lens barrel 2 includes: the motor moving tube 100 including the cam pin 101 and being movable along the optical axis OA when changing the focal length; the unit-five driving part 5M provided to the motor moving tube 100; the unit-five lens L5 being movable along the optical axis OA with respect to the motor moving tube 100 by the unit-five driving part 5M; the unit-six driving part 6M provided to the motor moving tube 100; and the unit-six lens L6 being movable along the optical axis OA with respect to the motor moving tube 100 by the unit-six driving part 6M. For simplicity, FIGS. 5A and 5B omit the unit-five driving part 5M, the unit-five frame 50, the unit-six driving part 6M, the unit-six frame 60, the sub guide bar 152, the sub guide bar 162, etc.

An example will be described below, in which the first focal length is described as the wide-angle end W, and the second focal length is described as the telescopic end T. At the first focal length (wide-angle end W) and the second focal length (telescopic end T), the unit-five lens L5 is arranged closest to the subject side when the subject distance is "near" N, and arranged closest to the image surface side when the subject distance is "infinity" ∞. At the first focal length (wide-angle end W) and the second focal length (telescopic end T), the unit-six lens L6 is arranged closest to the subject side when the subject distance is "near" N, and arranged closest to the image surface side when the subject distance is "infinity" ∞.

(1) Relationship Between the Moving Distances X1 and X2 of the Unit-Five Lens L5

As illustrated in FIG. 5A, WN5 of FIG. 5A indicates the position of the unit-five lens L5 in a first state (WN), in which the unit-five lens L5 is arranged closest to the subject side, at the first focal length (wide-angle end W). When the focal length is changed from the state WN5 illustrated in FIG. 5A to the second focal length (telescopic end T), the unit-five lens L5 moves to a position TN5 illustrated in FIG. 5B. X1 indicates the moving distance of the unit-five lens L5 with respect to the motor moving tube 100, in the case of changing the focal length from the first state (WN) to the second focal length (telescopic end T) without changing the subject distance.

W∞5 illustrated in FIG. 5A indicates the position of the unit-five lens L5 in a second state (W∞), in which the unit-five lens L5 is arranged closest to the image surface side, at the first focal length (wide-angle end W) illustrated in FIG. 5A. When the focal length is changed from the state W∞5 illustrated in FIG. 5A to the second focal length (telescopic end T), the unit-five lens L5 moves to the position T∞5 illustrated in FIG. 5B. X2 indicates the moving distance of the unit-five lens L5 with respect to the motor moving tube 100, in the case of changing the focal length from the second state (W∞) to the second focal length (telescopic end T) without changing the subject distance.

In this case, the moving distance Z of the motor moving tube 100 is set such that the moving distance X1 is smaller than the moving distance X2.

In other words, the driving distance X1 of the unit-five driving part 5M in the case of changing the focal length from the first state WN5 illustrated in FIG. 5A to the second focal length (telescopic end T) is smaller than the driving distance X2 of the unit-five driving part 5M in the case of changing the focal length from the second state W∞5 illustrated in FIG. 5A to the second focal length (telescopic end T).

Alternatively, the moving distance X1 of the unit-five lens L5 with respect to the main guide bar 151 in the case of changing the focal length from the first state WN5 illustrated in FIG. 5A to the second focal length (telescopic end T) is smaller than the moving distance X2 of the unit-five lens L5 with respect to the main guide bar 151 in the case of changing the focal length from the second state W∞5 illustrated in FIG. 5A to the second focal length (T).

This allows for reducing the moving distance X1 of the unit-five lens L5 with respect to the motor moving tube 100 in the case of changing the focal length from the state in which the unit-five lens L5 is arranged closest to the subject side; therefore, the main guide bar 151 and the motor moving tube 100 do not need to extend to the subject side. Therefore, the size can be thinner in the optical axis direction.

(2) Relationship Between the Moving Distance X1 of the Unit-Five Lens L5 and the Moving Distance Y1 of the Unit-Six Lens L6

As illustrated in FIG. 5A, WN6 of FIG. 5A indicates the position of the unit-six lens L6 in the first state (WN), in which the unit-six lens L6 is arranged closest to the subject side, at the first focal length (wide-angle end W). When the focal length is changed from the state WN6 illustrated in FIG. 5A to the second focal length (telescopic end T), the unit-six lens L6 moves to the position TN6 illustrated in FIG. 5B. Y1 indicates the moving distance of the unit-six lens L6 with respect to the motor moving tube 100, in the case of changing the focal length from the first state (WN) to the second focal length (telescopic end T) without changing the subject distance. Y1 may be a moving distance of the unit-six lens L6 with respect to the main guide bar 161 in the case of changing the focal length from the first state (WN) to the second focal length (telescopic end T), or may be a driving distance of the unit-six driving part 6M.

In this case, the moving distance Z of the motor moving tube 100 is set such that the moving distance X1 is smaller than the moving distance Y1.

This allows for reducing the moving distance X1 of the unit-five lens L5 with respect to the motor moving tube 100 in the case of changing the focal length from the state in which the unit-five lens L5 is arranged closest to the subject side; therefore, the main guide bar 151 and the motor moving tube 100 do not need to extend to the subject side. Therefore, the size can be thinner in the optical axis direction.

Effects of (1) and (2)

The unit-five lens L5 is arranged on the subject side, and the unit-six lens L6 is arranged on the image side, in the motor moving tube 100.

When the moving distance with respect to the motor moving tube 100 or the guide bar 151 by zooming is increased in the state in which the unit-five lens L5 arranged on the subject side of the motor moving tube 100 is arranged closest to the subject side, the length of the main guide bar 151 and the sub guide bar 152 or the length of the motor moving tube 100 needs to be increased, resulting in upsizing.

According to the present embodiment, the moving distance with respect to the motor moving tube 100 or the guide bar 151 by zooming is reduced in the state in which the unit-five lens L5 arranged on the subject side of the motor moving tube 100 is arranged closest to the subject side; therefore, the length of the main guide bar 151 and the sub guide bar 152 does not need to be increased, and the lens barrel 2 can be downsized and thinned.

(3) Relationship Between the Moving Distances Y1 and Y2 of the Unit-Six Lens L6

As illustrated in FIG. 5A, W∞6 of FIG. 5A indicates the position of the unit-six lens L6 in the second state (W∞), in which the unit-six lens L6 is arranged closest to the image surface side, at the first focal length (wide-angle end W). When the focal length is changed from the state of W∞6 illustrated in FIG. 5A to the second focal length (telescopic end T), the unit-six lens L6 moves to the position T∞6 illustrated in FIG. 5B. Y2 indicates the moving distance of the unit-six lens L6 with respect to the motor moving tube 100, in the case of changing the focal length from the second state (W∞) to the second focal length (telescopic end T) without changing the subject distance. Y2 may be a moving distance of the unit-six lens L6 with respect to the main guide bar 161 in the case of changing the focal length from the second state (W∞) to the second focal length (telescopic end T), or may be a driving distance of the unit-six driving part 6M.

In this case, the moving distance Z of the motor moving tube 100 is set such that Y2 is smaller than Y1. This allows for reducing the moving distance Y2 of the unit-six lens L6 with respect to the motor moving tube 100 in the case of changing the focal length from the state in which the unit-six lens L6 is arranged closest to the image surface side; therefore, the main guide bar 161 and the motor moving tube 100 do not need to extend to the image surface side. Therefore, the size can be thinner in the optical axis direction.

(4) Relationship Between the Moving Distance X2 of the Unit-Five Lens L5 and the Moving Distance Y2 of the Unit-Six Lens L6

The moving distance Z of the motor moving tube 100 is set such that the moving distance Y2 of the unit-six lens L6 with respect to the motor moving tube 100 in the case of changing the focal length from the second state (W∞) to the second focal length (telescopic end T) is smaller than the moving distance X2 of the unit-five lens L5 with respect to the motor moving tube 100 in the case of changing the focal length from the second state (W∞) to the second focal length (telescopic end T).

This allows for reducing the moving distance Y2 of the unit-six lens L6 with respect to the motor moving tube 100 in the case of changing the focal length from the state in which the unit-six lens L6 is arranged closest to the image surface side; therefore, the main guide bar 161 and the motor moving tube 100 do not need to extend to the image surface side. Therefore, the size can be thinner in the optical axis direction.

Effects of (3) and (4)

The unit-five lens L5 is arranged on the subject side, and the unit-six lens L6 is arranged on the image side, in the motor moving tube 100.

When the moving distance with respect to the motor moving tube 100 or the guide bar 161 by zooming is increased in the state in which the unit-six lens L6 arranged on the image side of the motor moving tube 100 is arranged closest to the image side, the length of the main guide bar 161 and the sub guide bar 162 or the length of the motor moving tube 100 needs to be increased, resulting in upsizing.

According to the present embodiment, the moving distance with respect to the motor moving tube 100 or the guide bar 161 by zooming is reduced in the state in which the unit-six lens L6 arranged on the image side of the motor moving tube 100 is arranged closest to the image side; therefore, the length of the main guide bar 161 and the sub guide bar 162 does not need to be increased, and the lens barrel 2 can be downsized.

(5) Positional Relationship Between the Unit-Five Lens L5 and the Unit-Six Lens L6

The unit-six lens L6 (WN6) in the first state (wide-angle end W; near state N) is arranged closer to the image surface side than the unit-five lens L5 (W∞5) in the second state (wide-angle end W; infinity state ∞). The unit-six lens L6 in the case of changing the focal length from the first state (WN) to the second focal length (telescopic end T) (TN6) is arranged closer to the subject side than the unit-five lens L5 (T∞5) in the case of changing the focal length from the second state (W∞) to the second focal length (telescopic end T). Specifically, as illustrated in FIGS. 5A and 5B, the positional relationship between the position of arranging the unit-five lens L5 closest to the image surface side at the wide-angle end W (W∞5) and the position of arranging the unit-six lens L6 closest to the subject side (WN6) is opposite to the position of arranging the unit-five lens L5 closest to the image surface side at the telescopic end T (T∞5) and the position of arranging the unit-six lens L6 closest to the subject side (TN6). This allows the unit-five lens L5 to move further to the image surface side, and the unit-six lens L6 to move further to the subject side, allowing wider movement within the range of the guide bars 151 and 161 and the motor moving tube 100.

Effects of (5)

With the lens barrel 2 in which the unit-five lens L5 and the unit-six lens L6 move in the same direction from the near N state to the infinity ∞ state, the positional relationship changes between the infinite state of the unit-five lens L5 (W∞5) and the near state (WN6) of the unit-six lens L6 at the wide-angle end W, and the positional relationship changes between the infinite state (T∞5) of the unit-five lens L5 and the near state (TN6) of the unit-six lens L6 at the telescopic end T.

This allows for efficiently using the guide bars 151, 152, 161 and 162 for guiding the unit-five lens L5 and the unit-six lens L6; therefore, the lens barrel 2 can be downsized and thinned.

(6) FIG. 6 is a diagram illustrating the moving distance of the unit-five lens L5 in the near N state, the moving distance of the unit-six lens L6 in the infinity ∞ state, and the moving distance of the motor moving tube 100, in the case of changing the focal length from the wide-angle end W to the telescopic end T.

XX1 indicates the moving distance of the unit-five lens L5 in the case of changing the focal length from the wide-angle end W to the telescopic end T, in the near N state. YY1 indicates the moving distance of the unit-six lens L6 in the case of changing the focal length from the wide-angle end W to the telescopic end T, in the infinity ∞ state. ZZ indicates the moving distance of the motor moving tube 100 in the case of changing the focal length from the wide-angle end W to the telescopic end T.

Figure 6A:
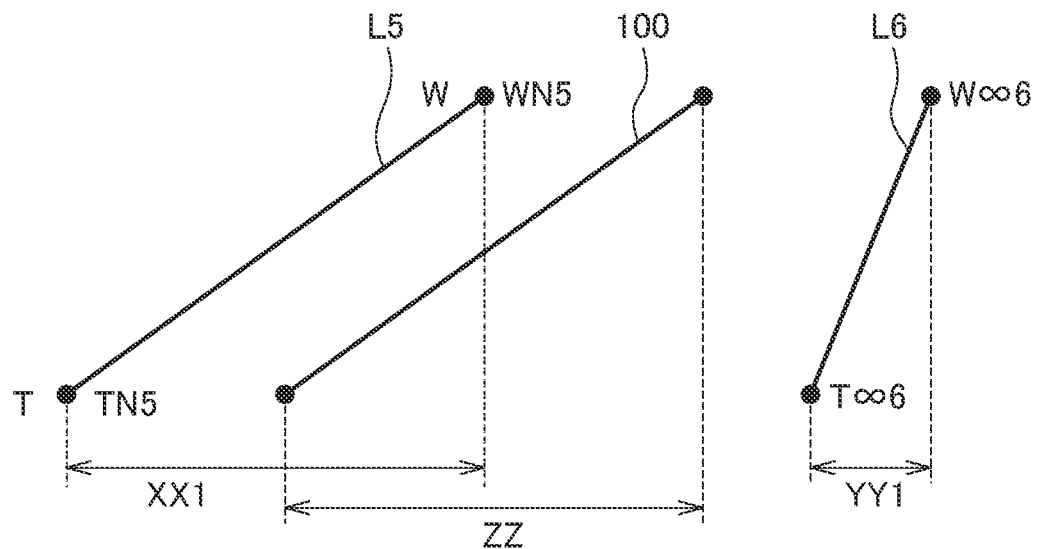
FIGS. 6A and 6B are diagrams illustrating a moving distance of the unit-five lens L5, a moving distance of the unit-six lens L6, and a moving distance of the motor moving tube 100, in a case of changing the focal length from the wide-angle end (W) to the telescopic end (T).
Figure 6B:
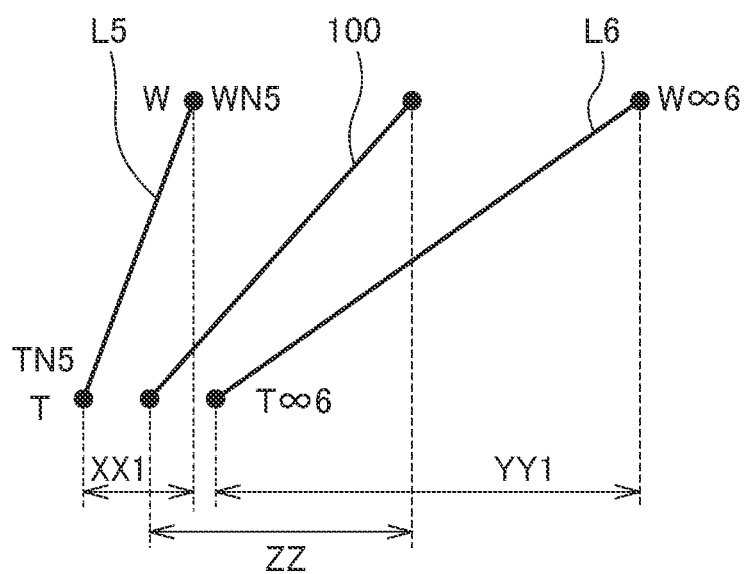

In the present embodiment, the moving distance ZZ of the motor moving tube 100 in the case in which the moving distance XX1 of the unit-five lens L5 is larger than the moving distance YY1 of the unit-six lens L6 as illustrated in FIG. 6A is larger than the moving distance ZZ of the motor moving tube 100 in the case in which the moving distance XX1 of the unit-five lens L5 is smaller than the moving distance YY1 of the unit-six lens L6 as illustrated in FIG. 6B.

Effects of (6)

By setting a movement path of the motor moving tube 100 as described above, both X1 and Y2 in FIG. 5B can be reduced.

(7) When the lens barrel 2 zooms from the wide-angle end W to the telescopic end T, the motor moving tube 100 moves in the optical axis OA direction. The unit-five lens L5 and the unit-six lens L6 move with respect to the motor moving tube 100 by the unit-five driving part 5M and the unit-six driving part 6M.

In this case, the unit-five lens L5 and the unit-six lens L6 move in a single direction with respect to the motor moving tube 100. Specifically, the unit-five lens L5 and the cam pin 101 of the motor moving tube 100, for example, are in a positional relationship of always separating away when zooming in the focused state at infinity ∞. The unit-six lens L6 and the cam pin 101 of the motor moving tube 100, for example, are also in a positional relationship of always separating away when zooming in the focused state at infinity ∞.

However, the present invention is not limited thereto; and the unit-five lens L5 as well as the unit-six lens L6 and the cam pin 101 of the motor moving tube 100, for example, may be in a positional relationship of always approaching or being constant, when zooming in the focused state at infinity ∞.

The unit-five lens L5 as well as the unit-six lens L6 and the motor moving tube 100 at the near N may be in a positional relationship of always approaching, separating, or being constant, when zooming in the focused state at infinity ∞.

Effects of (7)

When the unit-five lens L5 as well as the unit-six lens L6 and the motor moving tube 100 are in a positional relationship of moving in opposite directions instead of a single direction (in the case of U-turning) when zooming in the focused state at infinity ∞, the unit-five driving part 5M and the unit-six driving part 6M will rotate in the opposite directions.

Then, a delay may be caused by looseness between the unit-five driving part 5M as well as the unit-six driving part 6M and the lead screw.

However, in the present embodiment, the unit-five driving part 5M and the unit-six driving part 6M constantly rotate in a single direction; therefore, looseness does not occur, and a delay in movement does not occur.

The lens barrel 2 is more likely to be zoomed in the infinity state than in the near state; therefore, reverse rotation may be prevented in the infinity state as in the case of the present embodiment. However, reverse rotation may be prevented in the near state, or reverse rotation may be prevented in in both the infinity state and the near state.

The embodiment has been described above, in which the first focal length is the wide-angle end W and the second focal length is the telescopic end T; however, the present invention is not limited thereto. For example, the first focal length may be a middle 1, and the second focal length may be a middle 2 having a longer focal length than the middle 1.

The embodiment has been described above, in which the unit-five lens L5 is arranged closest to the subject side in the case in which the subject distance is the near N at the wide-angle end W and the telescopic end T, and arranged closest to the image surface side in the case in which the subject distance is the infinity ∞; however, the present invention is not limited thereto. For example, the unit-five lens L5 may be arranged closest to the subject side in the case in which the subject distance is the infinity ∞, and may be arranged closest to the image surface side in the case in which the subject distance is the near N.

The embodiment has been described above, in which the unit-six lens L6 is arranged closest to the subject side in the case in which the subject distance is the near N, and arranged closest to the image surface side in the case in which the subject distance is the infinity ∞, at the first focal length (wide-angle end W) and the second focal length (telescopic end T); however, the present invention is not limited thereto. For example, the unit-six lens L6 may be arranged closest to the subject side in the case in which the subject distance is the infinity ∞, and may be arranged closest to the image surface side in the case in which the subject distance is the near N.

It should be noted that the present invention is not limited to the above-described embodiments, and any combination thereof may be used.

EXPLANATION OF REFERENCE NUMERALS

OA: optical axis; 2: lens barrel; 3: camera body; 5M: unit-five driving part; 50: unit-five frame; 51: unit-five retaining part; 6M: unit-six driving part; 60: unit-six frame; 81: zoom ring; 82: outer cam tube; 83: inner cam tube; 84: outer fixed tube; 85: inner fixed tube; 86: focus ring; 90: control part; 92: cam follower; 100: motor moving tube; 101: cam pin; 103: front wall part; 151: main guide bar; 152: sub guide bar; 161: main guide bar; 162: sub guide bar; 170: guide bar holding member; 501: unit frame; 502: lead screw; 503: moving rack; 511: main guide bar engaging part; 511*a*: front wall; 511*b*: rear wall; 511*c*: light shielding part; 511*d*: side wall; 511*e*: guide bar insertion hole; 512: sub guide bar engaging part

The invention claimed is:

1. A lens barrel, comprising:
a moving tube that moves along an optical axis when changing a focal length;

a first driving part provided to the moving tube;
a first lens that relatively moves along the optical axis with respect to the moving tube by the first driving part;
a second driving part provided to the moving tube; and
a second lens that relatively moves along the optical axis with respect to the moving tube by the second driving part, wherein
a moving distance of the first lens with respect to the moving tube, in a case of changing a focal length to a second focal length in a first state in which the first lens is arranged closest to a subject side at a first focal length, is smaller than a moving distance of the first lens with respect to the moving tube, in a case of changing a focal length to the second focal length in a second state in which the first lens is arranged closer to an image surface side at the first focal length than in the first state.

2. The lens barrel according to claim 1, wherein the second lens is arranged closer to the image surface side than the first lens, and
a moving distance of the first lens with respect to the moving tube, in a case of changing a focal length to the second focal length in the first state, is smaller than a moving distance of the second lens with respect to the moving tube, in a case of changing a focal length to the second focal length in the first state.

3. The lens barrel according to claim 1, wherein a moving distance of the second lens with respect to the moving tube, in a case of changing a focal length to the second focal length in the second state, is smaller than a moving distance of the second lens with respect to the moving tube, in a case of changing a focal length to the second focal length in the first state.

4. The lens barrel according to claim 1, wherein a moving distance of the second lens with respect to the moving tube, in a case of changing a focal length to the second focal length in the second state, is smaller than a moving distance of the first lens with respect to the moving tube, in a case of changing a focal length to the second focal length in the second state.

5. The lens barrel according to claim 1, wherein the second lens in the second state is arranged closer to the image surface side than the second lens in the first state.

6. The lens barrel according to claim 1, wherein the second lens in the first state is arranged closer to the image surface side than the first lens in the second state,
the second lens in a case of changing a focal length to the second focal length in the first state is arranged closer to the subject side than the first lens in a case of changing a focal length to the second focal length in the second state.

7. The lens barrel according to claim 1, wherein the moving tube includes a cam follower, and the first lens moves in a certain direction with respect to the cam follower in a case of changing a focal length in the first state or the second state.

8. The lens barrel according to claim 1, wherein a moving distance of the moving tube, in a case in which a moving distance of the first lens in a case of changing a focal length to the second focal length in the first state is larger than a moving distance of the second lens in a case of changing a focal length to the second focal length in the second state, is larger than a moving distance of the moving tube, in a case in which a moving distance of the first lens in a case of changing a focal length to the second focal length in the first state is smaller than a moving distance of the second lenses in a case of changing a focal length to the second focal length in the second state.

9. An imaging device, comprising the lens barrel according to claim 1.

10. A lens barrel, comprising:
a moving tube that moves along an optical axis when changing a focal length;
a first driving part provided to the moving tube;
a first lens that relatively moves along the optical axis with respect to the moving tube by the first driving part;
a second driving part provided to the moving tube; and
a second lens that relatively moves along the optical axis with respect to the moving tube by the second driving part, wherein
a moving distance of the first lens with respect to the moving tube, in a case of changing a focal length to a second focal length in a first state in which the first lens is arranged closest to a subject side at a first focal length, is smaller than a moving distance of the second lens with respect to the moving tube, in a case of changing a focal length to the second focal length in the first state.

11. A lens barrel, comprising:
a moving tube that moves along an optical axis when changing a focal length;
a first driving part provided to the moving tube;
a first lens that relatively moves along the optical axis with respect to the moving tube by the first driving part;
a second driving part provided to the moving tube; and
a second lens that relatively moves along the optical axis with respect to the moving tube by the second driving part, wherein
a moving distance of the first lens arranged closest to a subject side in a case of changing a focal length is smaller than a moving distance of the second lens arranged closest to the subject side in a case of changing a focal length.

* * * * *